(12) United States Patent
Ko et al.

(10) Patent No.: US 11,331,896 B2
(45) Date of Patent: May 17, 2022

(54) METHOD OF MANUFACTURING EMBOSSED-IN-REGISTER FLOORING MATERIAL AND FLOORING MATERIAL MANUFACTURED USING THE METHOD

(71) Applicant: LG HAUSYS, LTD., Seoul (KR)

(72) Inventors: Haeseung Ko, Seoul (KR); Sangkyu Han, Seoul (KR); Minsu Kang, Seoul (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 17/051,361

(22) PCT Filed: May 31, 2019

(86) PCT No.: PCT/KR2019/006613
§ 371 (c)(1),
(2) Date: Oct. 28, 2020

(87) PCT Pub. No.: WO2019/231294
PCT Pub. Date: Dec. 5, 2019

(65) Prior Publication Data
US 2021/0229414 A1 Jul. 29, 2021

(30) Foreign Application Priority Data

Jun. 1, 2018 (KR) .................. 10-2018-0063277
May 31, 2019 (KR) .................. 10-2019-0064493

(51) Int. Cl.
*B32B 38/06* (2006.01)
*B32B 27/08* (2006.01)
(Continued)

(52) U.S. Cl.
CPC .............. *B32B 38/06* (2013.01); *B32B 27/08* (2013.01); *B32B 27/304* (2013.01);
(Continued)

(58) Field of Classification Search
CPC ....... B44C 5/04; B44C 1/24; B32B 2264/104; B32B 2255/26; B32B 2307/4023;
(Continued)

(56) References Cited

U.S. PATENT DOCUMENTS

| | | | |
|---|---|---|---|
| 8,853,328 B2 * | 10/2014 | Choi ...................... | B29C 71/04 525/222 |
| 2007/0166516 A1 | 7/2007 | Kim et al. | |
| 2018/0135313 A1 * | 5/2018 | Chen ....................... | B32B 3/06 |

FOREIGN PATENT DOCUMENTS

| KR | 10-2003-0040695 A | 5/2003 |
|---|---|---|
| KR | 20030040695 A | 5/2003 |

(Continued)

*Primary Examiner* — Vishal I Patel
(74) *Attorney, Agent, or Firm* — Dentons US LLP (57) ABSTRACT

The present invention relates to a method of manufacturing an embossed-in-register flooring material and a flooring material manufactured using the method. More particularly, the present invention relates to a method of manufacturing an embossed-in-register flooring material including a step of manufacturing an embossed-in-register PVC transparent film and a step of laminating the embossed-in-register PVC transparent film on the upper surface of a bottom layer and a flooring material manufactured using the method. The method of the present invention may achieve process simplification by including these steps.

11 Claims, 3 Drawing Sheets

(51) Int. Cl.
    *B32B 27/30*    (2006.01)
    *B32B 38/00*    (2006.01)

(52) U.S. Cl.
    CPC ....... *B32B 38/145* (2013.01); *B32B 2307/412* (2013.01); *B32B 2471/00* (2013.01)

(58) Field of Classification Search
    CPC ... B32B 37/18; B32B 38/06; B32B 2307/412; B32B 2307/75; B32B 2250/24; B32B 2307/402; B32B 27/304; B32B 27/20; B32B 2471/00; B32B 3/30; B32B 2255/10; B32B 38/145; B32B 2307/732; B32B 27/08; B32B 2419/00; B32B 2250/04; B32B 2264/102; B32B 27/36; B41F 16/006; B41F 16/0026; B41F 19/08; B41F 19/02
    See application file for complete search history.

(56)                References Cited

FOREIGN PATENT DOCUMENTS

| KR | 10-2004-0102542 A | 12/2004 |
| KR | 20-0419456 | 6/2006 |
| KR | 10-1122218 B1 | 3/2012 |
| KR | 1020140035614 A | 3/2014 |
| KR | 10-2017-035614 A | 3/2017 |
| KR | 10-2017-0069659 A | 6/2017 |

\* cited by examiner

METHOD OF MANUFACTURING EMBOSSED-IN-REGISTER FLOORING MATERIAL AND FLOORING MATERIAL MANUFACTURED USING THE METHOD

This application is a National Stage Entry of International Application No. PCT/KR2019/006613, filed on May 31, 2019, and claims the benefit of and priority to Korean Application No. 10-2018-0063277, filed on Jun. 1, 2018, and Korean Application No. 10-2019-0064493, filed on May 31, 2019, all of which are hereby incorporated by reference in their entirety for all purposes as if fully set forth herein.

TECHNICAL FIELD

The present invention relates to a method of manufacturing an embossed-in-register flooring material and a flooring material manufactured using the method. More particularly, the present invention relates to a method of manufacturing an embossed-in-register flooring material including a step of manufacturing an embossed-in-register PVC transparent film and a step of laminating the embossed-in-register PVC transparent film on the upper surface of a bottom layer and a flooring material manufactured using the method. Unlike conventional methods of manufacturing an embossed-in-register flooring material, by including these steps, the method of the present invention may be performed in a simplified process.

BACKGROUND ART

In general, embossed-in-register printing is a process of aligning an embossed pattern with a printed pattern and printing the embossed pattern on the printed pattern to impart three-dimensional protrusion and depth to the printed pattern. Specifically, in embossed-in-register printing, a specific pattern, e.g., a plant annual ring pattern, is printed on a fabric such as a flooring material, an embossed or engraved pattern is aligned with the printed pattern, and then embossing printing is performed to provide the embossed or engraved pattern to the printed pattern of the fabric. Thereby, a three-dimensional effect may be imparted to the printed fabric.

By performing embossed-in-register printing, depth, three-dimensionality, realistic feeling, and luxury may be imparted to the printed pattern of a flat flooring material. For this reason, consumer satisfaction and preference for flooring materials subjected to embossed-in-register printing are increasing. Accordingly, various technologies for aligning an embossed pattern with a printed pattern and applying the embossed pattern onto the printed pattern have been proposed.

Therefore, to manufacture a flooring material having a printed pattern to which an embossed pattern is applied, a method of manufacturing an embossing plate matching a printed pattern and then applying an embossed pattern onto the printed pattern using a press has been used.

However, in the above method, a large number of embossing plates is required, and productivity is reduced due to a complicated process. In addition, the same printed pattern and embossed pattern are repeated, which limits realization of appearance.

In addition, for example, Korean Patent Application Publication No. 10-2014-0035614 discloses a wall finishing material including a glass paper layer, a PVC sol layer as an adhesive, a printing sheet layer, which is a printing fabric, a printing layer, which is an ink layer, a PLA transparent film layer, and a surface treatment layer. When embossed-in-register is performed, expansion and contraction of a printed material is prevented using glass paper, and then embossing is performed using embossing rolls while matching a pattern on the printing sheet layer.

However, since the glass paper is expensive, economic efficiency is deteriorated.

Therefore, to solve the above problems, there is increasing demand for a method of manufacturing an embossed-in-register flooring material having excellent three-dimensional texture, the method enabling implementation of various appearances, cost reduction, and process simplification.

RELATED ART DOCUMENTS

Patent Documents (Patent Document 1) KR 10-2014-0035614 A (Mar. 24, 2014)

DISCLOSURE

Technical Problem

Therefore, the present invention has been made in view of the above problems, and it is one object of the present invention to provide a method of manufacturing an embossed-in-register flooring material having excellent three-dimensional texture.

It is another object of the present invention to provide an embossed-in-register flooring material manufactured using the method of the present invention.

Technical Solution

In accordance with one aspect of the present invention, provided is a method of manufacturing an embossed-in-register flooring material including step S1 of manufacturing an embossed-in-register PVC transparent film; and step S3 of laminating the embossed-in-register PVC transparent film on an upper surface of a bottom layer.

In accordance with another aspect of the present invention, provided is an embossed-in-register flooring material manufactured using the method of manufacturing an embossed-in-register flooring material according to the present invention.

Advantageous Effects

Unlike conventional methods of manufacturing an embossed-in-register flooring material, since a method of manufacturing an embossed-in-register flooring material according to the present invention includes a step of manufacturing an embossed-in-register PVC transparent film and a step of laminating the embossed-in-register PVC transparent film on the upper surface of a bottom layer, implementation of various appearances, cost reduction, and process simplification can be achieved.

In an embossed-in-register flooring material of the present invention manufactured using the method of manufacturing an embossed-in-register flooring material, the position of the printed pattern of a printing layer formed on one surface of a PVC transparent film and the position of an embossed-in-register pattern formed on the other surface of the PVC transparent film match. Thereby, the embossed-in-register flooring material of the present invention can have excellent three-dimensional texture.

BEST MODE

Hereinafter, the present invention will be described in detail with reference to the accompanying drawings.

Figure 1:
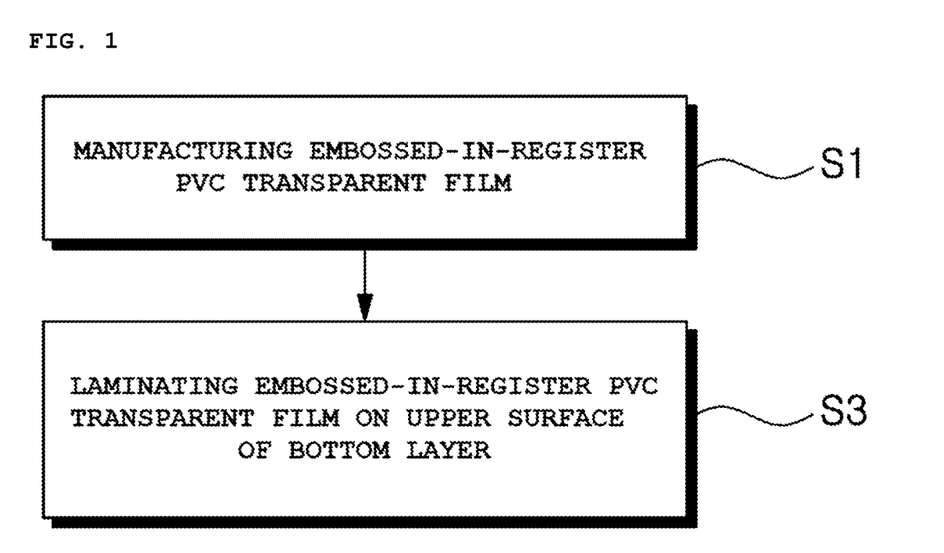
FIG. 1 is a process flowchart schematically showing a method of manufacturing an embossed-in-register flooring material of the present invention.

The present invention relates to a method of manufacturing an embossed-in-register flooring material including step S1 of manufacturing an embossed-in-register PVC transparent film; and step S3 of laminating the embossed-in-register PVC transparent film on the upper surface of a bottom layer (see FIG. 1).

Step S1 may include a step of maintaining a state wherein a transfer printing film is contact with one surface of a PVC transparent film, and at the same time, forming embossed-in-register patterns on the other surface of the PVC transparent film.

In this case, the transfer printing film may have a predetermined pattern printed using ink, and a printing layer may be formed on the one surface of the PVC transparent film through the transfer printing film.

For example, formation of the printing layer through the transfer printing film may be performed using transfer rolls heated to 100 to 130° C. or 110 to 130° C.

To prevent irregular stretching of the polyvinyl chloride (PVC) transparent film in a process from transfer printing to embossed-in-register pattern formation, the transfer printing film may be formed using one or more selected from the group consisting of polyethylene terephthalate (PET), polyethylene terephthalate glycol (PETG), and Teflon, which have excellent strength and rigidity while having significantly lower thermal expansion rates and significantly lower elongation rates at high temperature than PVC. Preferably, the transfer printing film is a PET film made of a PET material that has excellent polarity and heat resistance and is capable of enhancing the depth and the three-dimensional effect of embossed-in-register patterns.

The transfer printing film may have a thickness of 0.01 to 0.50 mm or 0.02 to 0.40 mm. When the thickness of the transfer printing film is within this range, proper strength and rigidity may be secured at an appropriate manufacturing cost.

For example, the ink may include one or more selected from the group consisting of water-based ink, acrylic ink, plastic sol ink, offset ink, and silicone ink. As a specific example, to increase adhesion between the bottom layer and the embossed-in-register PVC transparent film, acrylic ink having excellent adhesion properties may be used as the ink.

The embossed-in-register patterns may be formed by heating the PVC transparent film having the printing layer thereon to 130 to 160° C. or 135 to 155° C. by a heater, obtaining, by a color sensor, information about the printed patterns of the printing layer formed on one surface of the PVC transparent film, and then controlling operation of an embossed-in-register roll by a controller based on the information to form the embossed-in-registers on the other surface of the PVC transparent film.

The PVC transparent film may have a thickness of 0.05 to 1.00 mm or 0.20 to 0.80 mm. When the thickness of the PVC transparent film is less than the above range, the embossing effect of embossed-in-register may be insignificant. When the thickness of the PVC transparent film exceeds the above range, the embossing effect of embossed-in-register may be increased, but ease of handling may be deteriorated and economic efficiency may decrease due to increase in unit cost.

Step S1 may further include a step of removing the transfer printing film from the PVC transparent film after forming the embossed-in-register patterns on the other surface of the PVC transparent film.

For example, removal of the transfer printing film may be performed by a transfer printing film recovery roll mounted behind the embossed-in-register roll.

In step S1, the printing layer is formed on one surface of the PVC transparent film and the embossed-in-registers are formed on the other surface thereof, and then the transfer printing film is removed. Through this process, without a process of using expensive glass paper, expansion and contraction of the PVC transparent film having the printing layer thereon may be effectively prevented, thereby improving economic feasibility and achieving process simplification.

Step S1 may further include a step of, after forming the embossed-in-register patterns on the other surface of the PVC transparent film and before removing the transfer printing film from the PVC transparent film, cooling the PVC transparent film to 10 to 60° C. to prevent restoration of the formed embossed-in-register patterns.

For example, the cooling may be performed using an embossed-in-register roll equipped with a cooling apparatus or a separate cooling unit (not shown).

For example, the cooling unit may include one or more selected from the group consisting of a spray nozzle for spraying water, an immersion tank for immersion in water, and an air blower for blowing air.

Step S1 may be performed in an inline continuous process.

In step S3, the embossed-in-register PVC transparent film may be thermally laminated on the upper surface of the bottom layer.

For example, the bottom layer may be formed by forming a monochromatic film layer, a base layer, and a balance layer in a film or sheet shape using one or more selected from the group consisting of extrusion molding, calender molding, and blow molding, and then laminating these layers by applying heat and pressure using a lamination process known in the art to which the present invention pertains, without being limited thereto.

The monochromatic film layer has a white or other color, and serves to make the patterns of the embossed-in-register PVC transparent film appear clearly and to increase adhesion between the embossed-in-register PVC transparent film laminated on the upper surface thereof and the base layer laminated on the lower surface thereof to increase durability.

The monochromatic film layer may have a thickness of 0.01 to 0.20 mm or 0.05 to 0.15 mm, without being limited thereto.

For example, the monochromatic film layer may be a white film formed of a composition including 10 to 30 parts by weight or 20 to 30 parts by weight of a plasticizer, 1 to 100 parts by weight or 1 to 50 parts by weight of a filler, 1 to 50 parts by weight or 1 to 40 parts by weight of titanium dioxide, and 1 to 5 parts by weight or 1 to 3 parts by weight of a stabilizer based on 100 parts by weight of a PVC resin.

The base layer is the most basic layer of a flooring material, and serves to support layers located on the upper part thereof and to absorb shock applied to the upper or lower part thereof. The base layer may have a thickness of 1.00 to 7.00 mm or 1.00 to 5.00 mm, without being limited thereto.

For example, the base layer may be formed of a composition including 20 to 60 parts by weight or 30 to 50 parts by weight of a plasticizer, 100 to 700 parts by weight or 200 to 600 parts by weight of a filler, 1 to 20 parts by weight or 1 to 15 parts by weight of a processing aid, 1 to 5 parts by weight or 1 to 3 parts by weight of a stabilizer, and 1 to 10 parts by weight or 3 to 10 parts by weight of polyester fiber based on 100 parts by weight of a PVC resin.

The balance layer is a portion that is adhered to the bottom surface during construction, and serves to protect the back surface opposite to the surface of the manufactured embossed-in-register flooring material, block outflow of moisture from the floor, and maintain curling balance. The balance layer may have a thickness of 0.10 to 4.00 mm or 0.10 to 2.00 mm, without being limited thereto.

For example, the balance layer may be formed of a composition including 10 to 60 parts by weight or 20 to 40 parts by weight of a plasticizer, 2 to 6 parts by weight or 2 to 4 parts by weight of a stabilizer, and 1 to 200 parts by weight or 1 to 150 parts by weight of a filler based on 100 parts by weight of a PVC resin.

As a specific example, the bottom layer may be formed by forming the monochromatic film layer, the base layer, and the balance layer using calender rolls through calender molding, respectively, and then thermally laminating these layers at 140 to 160° C. or 145 to 155° C. in a roll-to-roll manner and in an inline continuous process so that the monochromatic film layer is positioned on the upper portion of the base layer and the balance layer is positioned on the lower portion of the base layer. However, the present invention is not limited thereto, and the bottom layer may further include an additional layer. Since the dimensions of the flooring material may change depending on temperature change when the floor is heated, the additional layer may be, for example, a dimension stabilization layer. As a specific example, the dimension stabilization layer may be located between the base layer and the monochromatic film layer of the bottom layer, without being limited thereto.

For example, when thermal lamination is performed so that the upper surface of the bottom layer faces the printing layer of the embossed-in-register PVC transparent film, thermal lamination may be performed at a temperature range of 80 to 140° C. or 90 to 130° C. When thermal lamination is performed at a temperature of less than the above range, lamination may fail. When thermal lamination is performed at a temperature exceeding the above range, the pre-formed embossed-in-register patterns may be restored, resulting in degradation in three-dimensional texture.

The method of manufacturing an embossed-in-register flooring material may further include, after step S3, step S5 of surface-treating the upper surface of the embossed-in-register PVC transparent film.

In step S5, a surface treatment layer may be formed on the upper surface of the embossed-in-register PVC transparent film.

The surface treatment layer serves to prevent adhesion of contaminants and improve scratch resistance and abrasion resistance, and may have a thickness of 10 to 30 μm or 15 to 25 μm, without being limited thereto.

For example, the surface treatment layer may be formed by performing coating using a coating solution prepared by dissolving a thermosetting or photocurable compound in a solvent, without being limited thereto. In the case of a thermosetting compound, when applying heat to form the surface treatment layer, the physical properties of the other layers located below the surface treatment layer may be changed by heat. Accordingly, the surface treatment layer may be formed using a photocurable compound.

In the embossed-in-register flooring material of the present invention manufactured using the method of manufacturing an embossed-in-register flooring material, the matching degree between the printed patterns of the printing layer and the embossed-in-register patterns may be 3 mm or less. The matching degree may be measured using a Vernier calipers. Since the embossed-in-register flooring material of the present invention has such matching degree, the position of the printed pattern of a printing layer formed on one surface of the PVC transparent film and the position of the embossed-in-register pattern formed on the other surface of the PVC transparent film match. Accordingly, the embossed-in-register flooring material may have excellent three-dimensional texture and esthetics.

In addition, when the embossed-in-register PVC transparent film is thermally laminated on the upper surface of the bottom layer, the embossed-in-register flooring material of the present invention may have an embossing retention rate of 80% or more. In this case, the average depth (Mi) of embossed-in-register patterns formed on the upper surface of the embossed-in-register PVC transparent film before the embossed-in-register PVC transparent film is thermally laminated on the upper surface of the bottom layer and the average depth (Mf) of embossed-in-register patterns formed on the upper surface of the embossed-in-register PVC transparent film after standing at room temperature for 10 minutes after lamination are measured using a confocal microscope, and then an embossing retention rate is calculated based on the measurement results. The embossed-in-register flooring material of the present invention has an embossing retention rate within this range, and thus may have excellent three-dimensional texture.

EXAMPLE

Example 1

(1) Manufacture of Embossed-in-Register PVC Transparent Film 40

(1-1) Formation of Printing Layer 41 on One Surface of PVC Transparent Film 42

Figure 2:
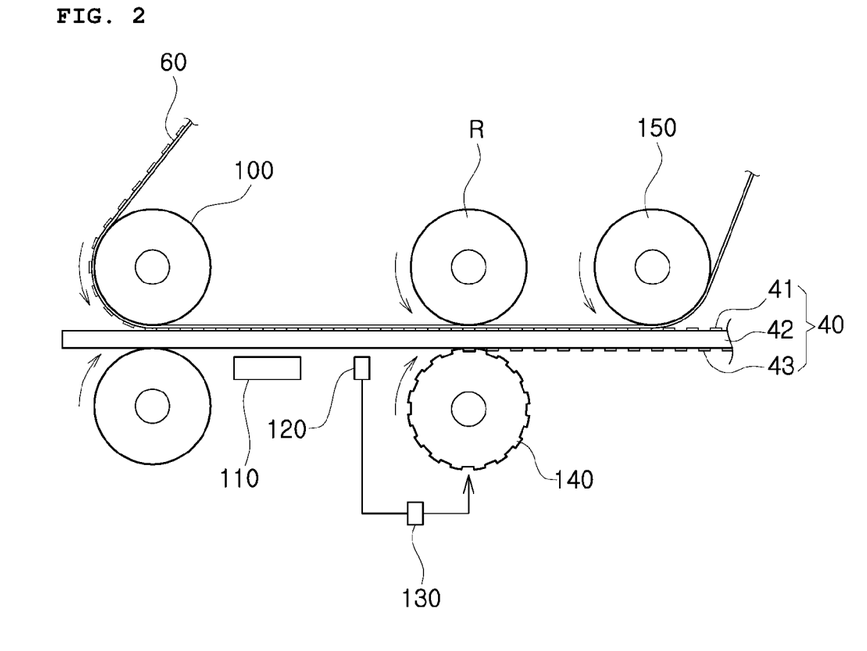
FIG. 2 is a schematic diagram showing an example of a method of manufacturing an embossed-in-register PVC transparent film of the present invention.

A PET film having a thickness of 0.025 mm and having predetermined patterns printed using acrylic ink was prepared for use as a transfer printing film 60, and transfer printing was performed using the PET film and using transfer rolls 100 heated to 130° C. to form a printing layer 41 on one surface of a PVC transparent film 42 having a thickness of 0.50 mm. At this time, the PET film used in transfer printing was not recovered, and remained in contact with the one surface of the PVC transparent film.

(1-2) Formation of Embossed-in-Register Patterns 43 on Other Surface of PVC Transparent Film 42

Embossed-in-register patterns 43 were formed on the other surface of the PVC transparent film 42. Specifically, the PVC transparent film 42 on which the printing layer 41 had been formed was heated to 150° C. by a heater 110, information about the printed patterns of the printing layer 41 formed on the one surface of the PVC transparent film 42 was obtained by a color sensor 120, and then operation of an embossed-in-register roll 140 was controlled by a controller 130 based on the information to form the embossed-in-register patterns 43 on the other surface of the PVC transparent film 42.

(1-3) Cooling and Recovery of PET Film

The PVC transparent film 42 was cooled to 25° C. to prevent the formed embossed-in-register patterns from being restored, and then the PET film was removed by a transfer printing film recovery roll 150 mounted behind the embossed-in-register roll 140 to manufacture an embossed-in-register PVC transparent film 40 (see FIG. 2).

In this case, (1-1) to (1-3) were performed in an inline continuous process.

Figure 3:
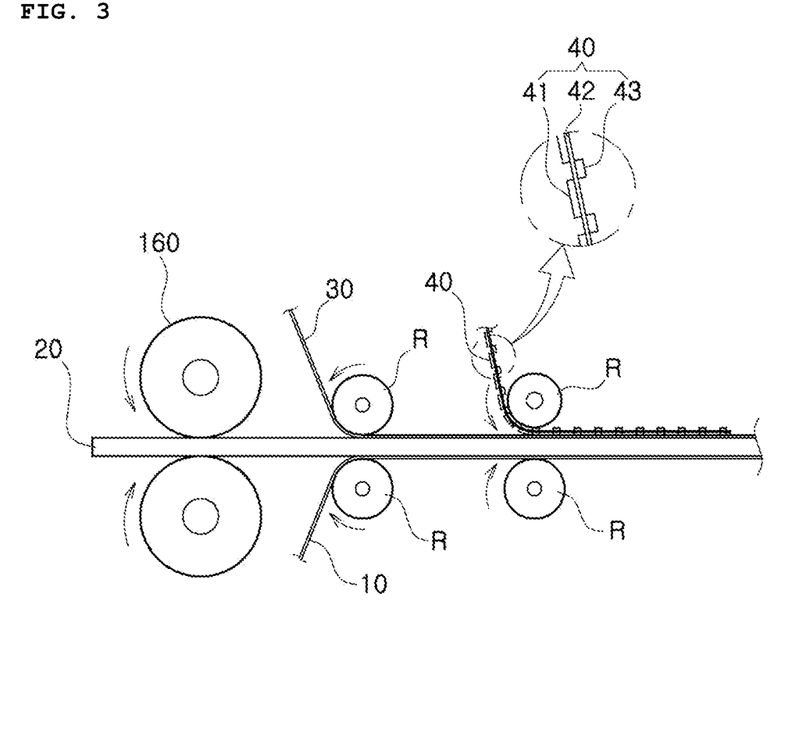
FIG. 3 is a schematic diagram showing an example of a step of laminating an embossed-in-register PVC transparent film on the upper surface of a bottom layer according to the present invention.

(2) Laminating Embossed-in-Register PVC Transparent Film on Upper Surface of Bottom Layer (2-1) Manufacture of Bottom Layer Separately from manufacture of the embossed-in-register PVC transparent film 40, a balance layer 10 and a monochromatic film layer 30 were manufactured using calender molding, respectively.

Specifically, the balance layer 10 having a thickness of 0.50 mm was manufactured using a composition including 20 parts by weight of a plasticizer, 3 parts by weight of a stabilizer, and 100 parts by weight of calcium carbonate based on 100 parts by weight of a PVC resin through calender molding.

The monochromatic film layer 30 having a thickness of 0.10 mm was manufactured using a composition including 25 parts by weight of a plasticizer, 10 parts by weight of calcium carbonate, 10 parts by weight of titanium dioxide, and 3 parts by weight of a stabilizer based on 100 parts by weight of a PVC resin through calender molding.

In addition, a base layer 20 having a thickness of 1.90 mm was manufactured using a composition including 40 parts by weight of a plasticizer, 500 parts by weight of calcium carbonate, 10 parts by weight of a processing aid, 3 parts by weight of a stabilizer, and 10 parts by weight of polyester fiber based on 100 parts by weight of a PVC resin using calender rolls 160 through calender molding, and then thermal lamination was performed at 150° C. using a roller (R) in a roll-to-roll manner and in an inline continuous process so that the monochromatic film layer 30 was positioned on the upper surface of the base layer 20 and the balance layer 10 was positioned on the lower surface of the base layer 20. Through this process, a bottom layer (S) having a thickness of 2.5 mm was manufactured.

(2-2) Laminating Embossed-in-Register PVC Transparent Film 40 on Upper Surface of Bottom Layer (S)

On the upper surface of the bottom layer (S) in which the balance layer 10, the base layer 20, and the monochromatic film layer 30 were laminated from bottom to top, the embossed-in-register PVC transparent film 40 was laminated at 100° C. in a roll-to-roll manner so that the printing layer 41 of the embossed-in-register PVC transparent film 40 faced the monochromatic film layer 30 (see FIG. 3).

(3) Surface Treatment

Figure 4:
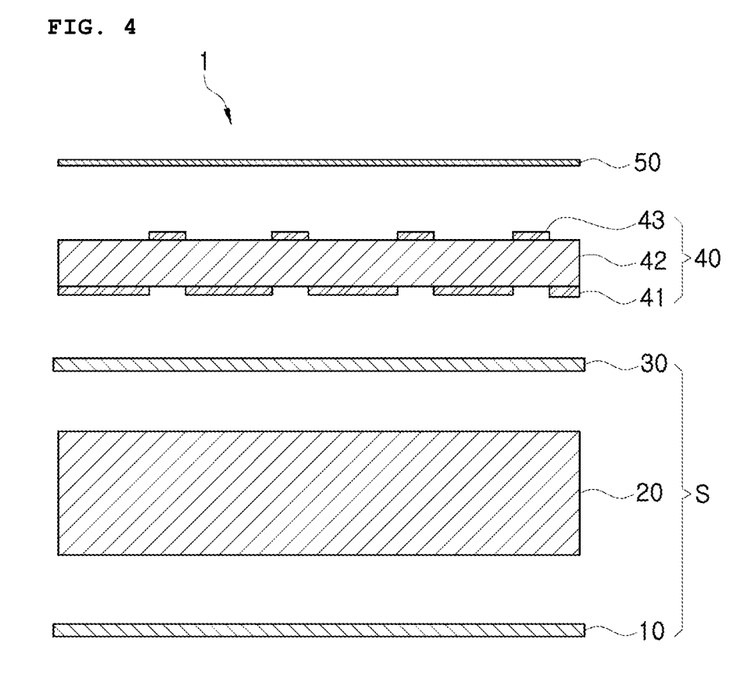
FIG. 4 is a schematic cross-sectional view of an embossed-in-register flooring material according to one embodiment of the present invention.

The upper surface of the embossed-in-register PVC transparent film 40 was coated with a photocurable urethane acrylate coating solution (CHOKWANG PAINT Co.) to form a surface treatment layer 50 having a thickness of 20 μm (see FIG. 4).

COMPARATIVE EXAMPLES

Comparative Example 1

A PET film having a thickness of 0.025 mm and having predetermined patterns printed using acrylic ink was prepared for use as the transfer printing film. Transfer printing was performed on the upper surface of the bottom layer, in which a balance layer, a base layer, and a monochromatic film layer were laminated from bottom to top, using the PET film and using transfer rolls heated to 130° C. to form a printing layer on the upper surface of the monochromatic film layer, and then the PET film was recovered.

Thereafter, a PVC transparent film was laminated at 150° C. on the upper surface of the monochromatic film layer on which the printing layer had been formed, and then an embossing plate matching the printed patterns of the printing layer formed on the upper surface of the monochromatic film layer was manufactured. Then, embossed-in-register patterns were formed on the upper surface of the PVC transparent film using a press machine heated to 150° C.

Thereafter, the upper surface of the PVC transparent film on which the embossed-in-register patterns had been formed was coated with a photocurable urethane acrylate coating solution (CHOKWANG PAINT Co.) to form a surface treatment layer having a thickness of 20 μm.

Comparative Example 2

Glass paper was laminated on the lower surface of the bottom layer, in which a balance layer, a base layer, and a monochromatic film layer were laminated from bottom to top. Then, a PET film having a thickness of 0.025 mm and having predetermined patterns printed using acrylic ink was prepared for use as a transfer printing film. Transfer printing was performed on the upper surface of the bottom layer using the PET film and using transfer rolls heated to 130° C. to form a printing layer on the upper surface of the monochromatic film layer, and then the PET film was recovered.

Thereafter, a PVC transparent film was laminated at 150° C. on the upper surface of the monochromatic film layer on which the printing layer had been formed, and then embossed-in-register patterns were formed on the upper surface of the PVC transparent film. Specifically, the PVC transparent film was heated to 150° C., information about the printed patterns of the printing layer formed on the upper surface of the monochromatic film layer was obtained by a color sensor, and then operation of an embossed-in-register roll was controlled based on the information to form embossed-in-register patterns on the upper surface of the PVC transparent film.

Thereafter, the upper surface of the PVC transparent film on which the embossed-in-register patterns had been formed was coated with a photocurable urethane acrylate coating solution (CHOKWANG PAINT Co.) to form a surface treatment layer having a thickness of 20 μm.

Comparative Example 3

A PET film having a thickness of 0.025 mm and having predetermined patterns printed using acrylic ink was prepared for use as a transfer printing film, transfer printing was performed on the upper surface of the bottom layer, in which a balance layer, a base layer, and a monochromatic film layer were laminated from bottom to top, using the PET film and using transfer rolls heated to 130° C. to form a printing layer on the upper surface of the monochromatic film layer, and then the PET film was recovered.

[95] Thereafter, a PVC transparent film was laminated at 150° C. on the upper surface of the monochromatic film layer on which the printing layer had been formed, and then embossed-in-register patterns were formed on the upper surface of the PVC transparent film. Specifically, the PVC transparent film was heated to 150° C., information about the printed patterns of the printing layer formed on the upper surface of the monochromatic film layer was obtained by a color sensor, and then operation of an embossed-in-register roll was controlled based on the information to form embossed-in-register patterns on the upper surface of the PVC transparent film.

Thereafter, the upper surface of the PVC transparent film on which the embossed-in-register patterns had been formed was coated with a photocurable urethane acrylate coating solution (CHOKWANG PAINT Co.) to form a surface treatment layer having a thickness of 20 μm.

Reference Example

Reference Example 1

An embossed-in-register flooring material was manufactured in the same manner as in Example 1, except that thermal lamination was performed at 150° C. in (2-2) of laminating an embossed-in-register PVC transparent film on the upper surface of a bottom layer.

Test Example

<Matching Degree Between Printed Pattern of Printing Layer and Embossed-in-Register Pattern>

A matching degree was obtained by measuring, using a Vernier calipers, the extent to which the embossed-in-register pattern deviated from the printed pattern of the printing layer in the length or width direction, and the results are shown in Table 1. When the matching degree was 3 mm or less, it was evaluated that the position of the printed pattern of the printing layer and the position of the embossed-in-register pattern matched.

<Embossing Retention Evaluation>

1) The average depth (Mi) of embossed-in-register patterns formed on the upper surface of the embossed-in-register PVC transparent film of each of Example 1 and Reference Example 1 was measured using a confocal microscope (DCM3D, LEICA) under conditions of ×100 magnification and 3×3 stitching. Subsequently, in each of Example 1 and Reference Example 1, the embossed-in-register PVC transparent film was thermally laminated on the upper surface of the bottom layer, and was allowed to stand for 10 minutes at room temperature. Then, in each case, the average depth (Mf) of embossed-in-register patterns formed on the upper surface of the embossed-in-register PVC transparent film was measured using the above-described confocal microscope under the same conditions.

2) In the cases of Comparative Examples 1 to 3, the depth of the embossed-in-register roll used was set to Mi. Embossed-in-register patterns were formed on the upper surface of the PVC transparent film, the average depth of the embossed-in-register patterns was measured, and the measured value was set to Mf. In this case, the Mf was measured using the above-described confocal microscope under the same conditions.

Embossing retention rates were calculated by substituting Mi and Mf values obtained according to 1) and 2) into Equation 1 below, and the results are shown in Table 1 below.

$$\text{Embossing retention rate (\%)} = \{1-((M_i-M_f)/M_i)\} \times 100 \quad \text{[Equation 1]}$$

When an embossing retention rate was 80% or more, it was evaluated that deformation of embossed patterns did not occur.

TABLE 1

| | Matching degree between printed pattern and embossed-in-register pattern | Embossing retention rate (%) |
|---|---|---|
| Example 1 | 1 mm or less | 90% or more |
| Comparative Example 1 | 1 mm or less | 90% or more |
| Comparative Example 2 | 1 mm or less | 90% or more |
| Comparative Example 3 | 5 to 10 mm (irregular) | 90% or more |
| Reference Example 1 | 1 mm or less | 50% or less |

In the case of the embossed-in-register flooring material of Example 1, the matching degree between the printed patterns of a printing layer and embossed-in-register patterns was 1 mm or less, indicating that the embossed-in-register flooring material of Example 1 had excellent three-dimensional texture and esthetics. In addition, the embossed-in-register flooring material of Example 1 had an embossing retention rate of 90% or more, indicating that deformation of the embossed patterns did not occur and the embossed-in-register flooring material of Example 1 had excellent three-dimensional texture. On the other hand, in the case of the embossed-in-register flooring material of Comparative Example 1, the matching degree between the printed patterns of a printing layer and embossed-in-register patterns was 1 mm or less, indicating that the embossed-in-register flooring material of Comparative Example 1 had excellent three-dimensional texture and esthetics. In addition, the embossed-in-register flooring material of Comparative Example 1 had an embossing retention rate of 90% or more, indicating that deformation of the embossed patterns did not occur and the embossed-in-register flooring material of Comparative Example 1 had excellent three-dimensional texture. However, the number of embossing plates required was large, and productivity was reduced due to a complicated process. In addition, in the case of the embossed-in-register flooring material of Comparative Example 2, the matching degree between the printed patterns of a printing layer and embossed-in-register patterns was 1 mm or less, indicating that the embossed-in-register flooring material of Comparative Example 2 had excellent three-dimensional texture and esthetics. In addition, the embossed-in-register flooring material of Comparative Example 2 had an embossing retention rate of 90% or more, indicating that deformation of the embossed patterns did not occur and the embossed-in-register flooring material of Comparative Example 2 had excellent three-dimensional texture. However, economic feasibility was poor because expensive glass paper was used.

Meanwhile, in the case of the embossed-in-register flooring material of Comparative Example 3, since glass paper for preventing elongation of a PVC transparent film by heat was not laminated on the lower surface of a bottom layer, when the PVC transparent film laminated on the bottom layer was heated to form embossed-in-register patterns, and then information about the printed patterns of a printing layer was obtained by a color sensor, irregular stretching in the longitudinal direction occurred due to the temperature and tension applied to the PVC transparent film. As a result, in the case of the embossed-in-register flooring material of Comparative Example 3, the matching degree between the printed patterns of a printing layer and embossed-in-register patterns was 5 to 10 mm, indicating that the embossed-in-register flooring material of Comparative Example 3 had poor three-dimensional texture and esthetics.

In addition, in the case of Reference Example 1, since an embossed-in-register PVC transparent film was thermally laminated on the upper surface of a bottom layer at 150° C., an embossing retention rate of 50% or less was exhibited, indicating that deformation of embossed patterns occurred and three-dimensional texture was poor.

| [Description of Symbols] |
|---|
| 1: EMBOSSED-IN-REGISTER FLOORING MATERIAL |
| 10: BALANCE LAYER |
| 20: BASE LAYER |
| 30: MONOCHROMATIC FILM LAYER |
| 40: EMBOSSED-IN-REGISTER PVC TRANSPARENT FILM |
| 41: PRINTING LAYER |
| 42: PVC TRANSPARENT FILM |
| 43: EMBOSSED-IN-REGISTER PATTERNS |
| 50: SURFACE TREATMENT LAYER |
| S: BOTTOM LAYER |
| 60: TRANSFER PRINTING FILM |
| 100: TRANSFER ROLLS |
| 110: HEATER |
| 120: COLOR SENSOR |
| 130: CONTROLLER |
| 140: EMBOSSED-IN-REGISTER ROLL |
| 150: TRANSFER PRINTING FILM RECOVERY ROLL |
| 160: CALENDER ROLLS |
| R: ROLLER |

The invention claimed is:

1. A method of manufacturing an embossed-in-register flooring material, comprising:
a step S1 of manufacturing an embossed-in-register PVC transparent film (S1); and
a step S3 of laminating the embossed-in-register PVC transparent film on an upper surface of a bottom layer,
wherein step S1 comprises maintaining a state wherein a transfer printing film is in contact with one surface of a PVC transparent film, and at the same time, forming embossed-in-register patterns on the other surface of the PVC transparent film.

2. The method according to claim 1, wherein the transfer printing film has a predetermined pattern printed using ink, and is responsible for forming a printing layer on the one surface of the PVC transparent film.

3. The method according to claim 1, wherein the transfer printing film has a thickness of 0.01 to 0.50 mm.

4. The method according to claim 2, wherein the ink comprises one or more selected from the group consisting of water-based ink, acrylic ink, plastic sol ink, offset ink, and silicone ink.

5. The method according to claim 1, wherein the PVC transparent film has a thickness of 0.05 to 1.00 mm.

6. The method according to claim 1, wherein step S1 further comprises removing the transfer printing film from the PVC transparent film after forming the embossed-in-register patterns on the other surface of the PVC transparent film.

7. The method according to claim 6, wherein step S1 further comprises cooling the PVC transparent film to 10 to 60° C. to prevent restoration of the formed embossed-in-register patterns after forming the embossed-in-register patterns on the other surface of the PVC transparent film and before removing the transfer printing film from the PVC transparent film.

8. The method according to claim 1, wherein, in step S1, no glass paper is used.

9. The method according to claim 1, wherein, in step S3, the embossed-in-register PVC transparent film is thermally laminated on the upper surface of the bottom layer.

10. The method according to claim 1, wherein the bottom layer is formed by laminating a balance layer, a base layer, and a monochromatic film layer from bottom to top.

11. The method according to claim 9, wherein the thermal lamination is performed at 80 to 140° C.

* * * * *